United States Patent [19]
Huang et al.

[11] Patent Number: 4,940,491
[45] Date of Patent: * Jul. 10, 1990

[54] COMPOSITION FOR THE PAINT DETACKIFICATION FOR BOTH WATERBORNE AND SOLVENT ENAMELS

[75] Inventors: Shu-Jen Huang, Naperville; David W. Scheimann, Addison, both of Ill.

[73] Assignee: Nalco Chemical Company, Naperville, Ill.

[*] Notice: The portion of the term of this patent subsequent to Dec. 20, 2005 has been disclaimed.

[21] Appl. No.: 405,782

[22] Filed: Sep. 11, 1989

Related U.S. Application Data

[62] Division of Ser. No. 312,795, Feb. 21, 1989, Pat. No. 4,888,386.

[51] Int. Cl.$^5$ ............................................. C02F 1/56
[52] U.S. Cl. ........................................ 134/38; 55/85
[58] Field of Search ............. 55/85; 134/38; 210/727, 210/738, 917; 252/175, DIG. 8; 427/421; 515/163

[56] References Cited

U.S. PATENT DOCUMENTS 4,656,059  4/1987  Mizuno et al. ..................... 427/345
4,764,561  8/1988  Kiss et al. ........................... 525/163
4,792,364  12/1988  Huang ................................. 134/38

OTHER PUBLICATIONS

*Kirk–Othmer Encyclopedia of Chemical Technology,* Third Edition, vol. 23, John Wiley & Sons, Inc. 1983.

*Primary Examiner*—Michael Lusignan
*Attorney, Agent, or Firm*—John G. Premo; Donald G. Epple

[57] ABSTRACT

Both waterborne and solvent enamels can be sprayed in a common paint spray booth and be detackified by a composition comprising a blend of a melamine-formaldehyde polymer, polyvinyl alcohol and a styrene acrylate copolymer. The invention also contemplates the use of these compositions in detackifying paint in paint spray booths.

1 Claim, No Drawings

COMPOSITION FOR THE PAINT DETACKIFICATION FOR BOTH WATERBORNE AND SOLVENT ENAMELS

This application is a division of ASN 07/312,795, filed Feb. 21, 1989, now U.S. Pat. No. 4,888,386, patented Dec. 19, 1989.

INTRODUCTION

In the 1980's the paint technology in the automotive industry, as well as industry in general, has advanced from the utilization of low dispersion lacquers to high solids enamels. This has been due to a need to reduce solvent emission and disposal. These high solid enamels are particularly useful in basecoat/clearcoat technology.

As the paint technology has advanced, more emphasis has been on spray booth detackifiers as high solid enamels are much harder to detackify than low dispersion lacquers.

The stringent EPA regulation on volatile organic component emission in automotive plants has forced the paint industry to look into higher solids paint technologies as well as waterborne enamels. Waterborne paints were used in the past with certain problems in the processing and durability of the coatings. The paint industry has made changes in their formulations and have combined the waterborne base coat with high solids clear coat technologies to produce a better finishing. Due to the major difference between waterborne and solvent base paint, different detackifier programs often are used to treat the spray booth water. A separate pit system has to be provided to accommodate the different program.

If it was possible to use a single composition that could detackify and treat both waterborne and solvent enamels, it would be possible to add greater flexibility to the operation and design of paint spray booths.

THE INVENTION

The invention comprises a paint spray booth detackifier composition for detackifying both waterborne and solvent enamel compositions consisting of a melamine-formaldehyde polymer (A), polyvinyl alcohol (B), and a styrene acrylate copolymer (C) combined in a weight ratio of A:B:C within the range of 2:0.1:1 to 4:0.5:1. The invention also relates to the method of paint detackification described herein using these compositions.

DISCUSSION OF THE INVENTION

The Melamine-Formaldehyde Resin

In practice, a suitable melamine-formaldehyde resin is provided under the trademark MAGNIFLOC 515C, a trademark of the American Cyanamid Company. Generally, suitable melamine formaldehyde resins should have a weight average molecular weight of at least 2,000 and be soluble in water at pH below 2.5. Preferably, the molecular weight will be in the range of 2,500–4,000.

The Styrene-Acrylate Resin

A suitable styrene-acrylate resin is provided under the trademark ESICRYL R-11, a trademark of the Emulsion System Company or OPACIFIER 11, a trademark of the Essential Chemical Company. Styrene-acrylate resins generally can be used. However, the most preferred resins will have a molecular weight within the range of 50,000–100,000 and a particle size of 0.05µ–1.0µ.

The Polyvinyl Alcohol

Three important commercially available types of polyvinyl alcohol are distinguished by the mol percent residual acetate groups in the resin, i.e., fully hydrolyzed (1–2 mol % acetate), intermediate hydrolyzed (3–7 mol %), and partially hydrolyzed (10–15 mol %) polyvinyl alcohol.

Typical commercially available polyvinyl alcohols that may be used in the practice of the invention are set forth below in Table I.

TABLE I

Molecular Weight of Main Commercial Polyvinyl Alcohol Grades

| Viscosity Grade | Nominal $M_n$ | 4% Solution Viscosity mPa s (=cP)[1] |
| --- | --- | --- |
| low | 2,000–25,000 | 5–7 |
| intermediate | 30,000–40,000 | 13–16 |
| medium | 60,000 | 28–32 |
| high | 100,000 | 55–65 |

[1]Measured at 20° C. with Brookfield viscometer.

For more information with respect to polyvinyl alcohol, see *Kirk-Othmer Encyclopedia of Chemical Technology*, Third Edition, Vol. 23, John Wiley & Sons, Inc., 1983.

The preferred polyvinyl alcohol polymers are those having a 10,000 molecular weight.

The styrene acrylate polymer is usually fed separately from the melamine-formaldehyde resin and the polyvinyl alcohol which may be easily fed as a unitary mixture.

DOSAGE

As indicated, the dosage of the composition based on an active resin basis will be at least 25 ppm. Generally the dosage will range between 25 to 150 ppm based on an active resin basis and most preferably will be 25 to 50 ppm.

LABORATORY TEST

Laboratory tests were conducted using a clay/amine product which is a standard in the industry today, representing over 60% of the U.S. detackifying market for high density paint systems.

Desired amounts of detackifiers were added to the water manually or using a chemical pump to monitor the chemical demand. These detackifiers were allowed to mix in the tank through water circulation for 5 minutes. The paint being tested was then sprayed into the chamber at a rate of 2 ml/min through an air atomized spray gun located 12 inches above the center of the scrubbing section. An exhaust fan pulling air from the lower section of the scrubbing chamber helped the air flow through the water and increased scrubbing efficiency. This exhaust fan also aided in eliminating paint mist during the test and made the whole unit operable in that atmosphere. The test paint was sprayed for 10 minutes and the paint kill then tested for tackiness or stickiness. Tackiness or stickiness was determined by wetting the test runner's hand by the water solution in the test tank and taking a sample of the floating paint sludge from the water tank and squeezing and rubbing it slightly between his fingers until a degree tackiness is determined. The test is somewhat subjective. However, that is the best method that is currently available.

In general, at the conclusion of a good paint kill, paint is continuously sprayed, and the paint sludge conditions tested every 10 minutes. At any given time, if any trace of tackiness of sludge is present, paint spray should be discontinued and the program re-examined. The amount of paint sprayed, the chemical dosage, and condition of sludge should be recorded.

The degree of paint kill is described below in Table II.

TABLE II

CHART FOR DEGREE OF PAINT KILL

| | | |
|---|---|---|
| 10 | Perfect | Complete kill, sludge is soupy. |
| 9 | Excellent | Paint sludge is non-tacky, non-gritty. |
| 8 | Very Good | Paint sludge is not tacky or gritty, but slightly plastic, may roll. |
| 7 | Good | Not tacky, plastic consistency, sludge rolls and can easily reroll. |
| 6 | OK | Minimum performance, very slightly tacky. It rolls with water and reroll. Can wash off without rubbing. |
| 5 | Borderline | May stick slightly to glove, but falls off with rubbing. |
| 4 | Unacceptable | Slight tacky, sticks to glove with pressure, does not rub off, may roll. |
| 3 | Moderate Failure | Does not roll, stick to glove, smears. |
| 2 | Severe Failure | Tacky, smears |
| 1 | Very Sticky | Smears |
| 0 | Like Raw Paint | |

Using the above test procedure, the following is presented by way of example:

EXAMPLE

The following were used for the test:

A = Clear coat 50% solids acrylic
B = Base coat 50% solids acrylic white base coat
C = Waterborne silver metallic base coat 25% solids
D = Waterborne red base coat 25% solids
Experiment I: Spray A and B in the same water
Initial Charge: Melamine formaldehyde/polyvinyl alcohol/styrene acrylate 22:3:8 ratio at 45 ppm active
Maintenance Dosage: 10:1 paint:product (active)
Spray condition: 2 ml/min at 5 gpm water recirculation rate
Experiment II: Spray A, C and D in the same water
Initial Charge: Melamine formaldehyde/polyvinyl alcohol/styrene acrylate 22:3:8 ratio at 45 ppm active
Maintenance Dosage: Greater than 35:1 paint:product (active)
Spray condition: 2 ml/min at 5 gpm water recirculation rate In Experiment II, where solvent base clear coat paint and water borne base coat paint were sprayed in the same system, less chemicals were required to maintain a clean booth than experiment I, where solvent base clear coat paint and solvent base clear coat paint were sprayed in the same system.

Traditionally, water borne paint and solvent base paint were treated separately due to the big differences of paint nature. Solvent base paint was traditionally treated with clay detackifier while water borne paint was treated with water clarification chemicals such as aluminum sulfate, polyaluminum chloride, and/or polyelectrolyte (polyamine, PolyDADMAC, etc.) Neither clay nor water clarification chemicals are effective in treating a combined solvent base paint and water borne paint system. Water turbidity increased in the case with clay-based product, sticky, non-detackified paint resulted in the case with water clarification chemicals treatment program.

The invention allows the use of the same system for both waterborne and solvent base paint. Furthermore, this all organic program produces a synergistic effect when these two types of paints were used in the same booth. A much lower dosage is observed with waterborne base coat/solvent clear coat than with solvent base coat/solvent clear coat.

Having thus described our invention, we claim:

1. The method for detackifying paint in a paint spray booth conprising the steps of dosing a paint spray booth collection system with at least 25 ppm of a composition consisting of a melamine-formaldehyde polymer (A), polyvinyl alcohol (B), and a styrene acrylate copolymer (C), combined in a weight ratio of A:B:C, being within the range of 2:1:1 to 4:5:1.

* * * * *